United States Patent
Jung et al.

(10) Patent No.: US 8,787,693 B2
(45) Date of Patent: Jul. 22, 2014

(54) PREDICTION OF IMAGES BY PRIOR DETERMINATION OF A FAMILY OF REFERENCE PIXELS, CODING AND DECODING USING SUCH A PREDICTION

(75) Inventors: Joël Jung, Le Mesnil Saint-Denis (FR); Guillaume Laroche, Rennes (FR)

(73) Assignee: Orange, Paris (FR)

( * ) Notice: Subject to any disclaimer, the term of this patent is extended or adjusted under 35 U.S.C. 154(b) by 666 days.

(21) Appl. No.: 12/937,293

(22) PCT Filed: Apr. 7, 2009

(86) PCT No.: PCT/FR2009/050601
§ 371 (c)(1),
(2), (4) Date: Oct. 11, 2010

(87) PCT Pub. No.: WO2009/136066
PCT Pub. Date: Nov. 12, 2009

(65) Prior Publication Data
US 2011/0026845 A1     Feb. 3, 2011

(30) Foreign Application Priority Data
Apr. 15, 2008   (FR) ...................................... 08 52531

(51) Int. Cl.
*G06K 9/46* (2006.01)
*H04N 7/12* (2006.01)

(52) U.S. Cl.
USPC ..................................... 382/239; 375/240.12

(58) Field of Classification Search
None
See application file for complete search history.

(56) References Cited

U.S. PATENT DOCUMENTS

| | | | |
|---|---|---|---|
| 2003/0223645 A1* | 12/2003 | Sun et al. | 382/239 |
| 2004/0028282 A1* | 2/2004 | Kato et al. | 382/236 |
| 2005/0013376 A1* | 1/2005 | Dattani et al. | 375/240.24 |
| 2005/0265447 A1* | 12/2005 | Park | 375/240.03 |
| 2006/0002466 A1* | 1/2006 | Park | 375/240.03 |
| 2006/0013317 A1* | 1/2006 | Lainema | 375/240.24 |
| 2006/0120456 A1* | 6/2006 | Tasaka et al. | 375/240.16 |
| 2007/0053433 A1* | 3/2007 | Song | 375/240.13 |
| 2007/0053443 A1* | 3/2007 | Song | 375/240.24 |
| 2007/0121731 A1* | 5/2007 | Tanizawa et al. | 375/240.24 |
| 2007/0206872 A1* | 9/2007 | Song | 382/236 |

(Continued)

FOREIGN PATENT DOCUMENTS

| | | |
|---|---|---|
| EP | 0 895 424 A2 | 2/1999 |
| EP | 1 761 063 A2 | 3/2007 |
| WO | WO 2008/016605 A2 | 2/2008 |

OTHER PUBLICATIONS

Hung et al., "On Macroblock Partition for Motion Compensation," Proceedings of the 2006 IEEE International Conference on Image Processing (ICIP 2006), IEEE, Piscataway, NJ, US, pp. 1697-1700 (Oct. 1, 2006).

(Continued)

*Primary Examiner* — Wenpeng Chen
(74) *Attorney, Agent, or Firm* — Drinker Biddle & Reath LLP

(57) ABSTRACT

A method is provided for predicting partitions of at least one group of pixels in an image to be coded, with respect to a group of reference pixels. Accordingly, the group of reference pixels is obtained by calculating a function characteristic of a predetermined mode of prediction, the reference pixels of the group obtained being variable from one partition to another.

24 Claims, 7 Drawing Sheets

(56) References Cited

U.S. PATENT DOCUMENTS

| | | | |
|---|---|---|---|
| 2007/0253491 A1* | 11/2007 | Ito et al. | 375/240.24 |
| 2007/0286286 A1* | 12/2007 | Heng et al. | 375/240.16 |
| 2008/0043840 A1* | 2/2008 | Song | 375/240.11 |
| 2008/0056347 A1* | 3/2008 | Chiu et al. | 375/240 |
| 2008/0151997 A1* | 6/2008 | Oguz | 375/240.02 |
| 2008/0232705 A1* | 9/2008 | Sohn et al. | 382/238 |
| 2008/0240238 A1* | 10/2008 | Yoshino et al. | 375/240.12 |
| 2008/0240246 A1* | 10/2008 | Lee et al. | 375/240.16 |
| 2009/0110069 A1* | 4/2009 | Jung et al. | 375/240.12 |
| 2009/0268810 A1* | 10/2009 | Dai | 375/240.12 |
| 2009/0310677 A1* | 12/2009 | Shiodera et al. | 375/240.15 |

OTHER PUBLICATIONS

Sullivan et al., "Rate-Distortion Optimization for Video Compression," IEEE Signal Processing Magazine, IEEE, Piscataway, NJ, US, vol. 15 (6), pp. 74-90 (Nov. 1, 1998).

Wiegand et al., "Overview of the H.264/AVC Video Coding Standard," IEEE Transactions on Circuits and Systems for Video Technology, IEEE Service Center, Piscataway, NJ, US, vol. 13 (7), pp. 560-576 (Jul. 2003).

* cited by examiner

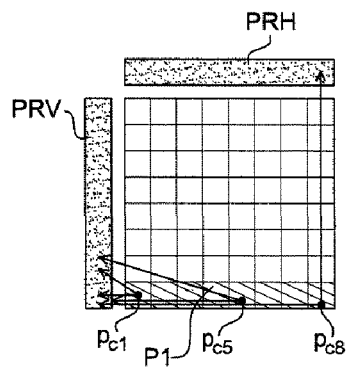
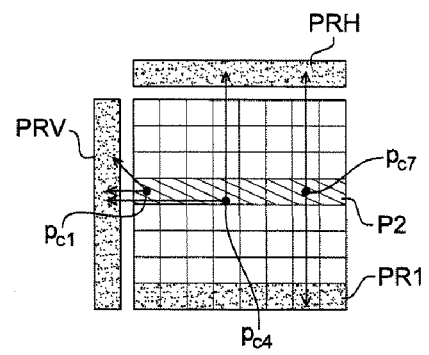
Fig. 6A  Fig. 6B
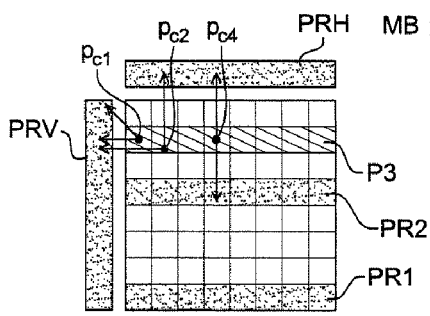
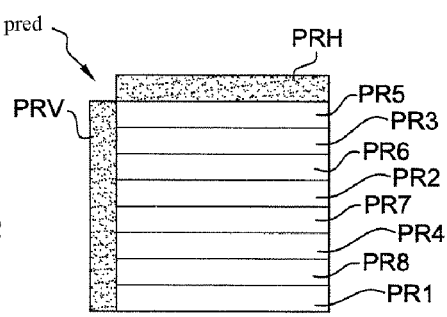
Fig. 6C  Fig. 6D

PREDICTION OF IMAGES BY PRIOR DETERMINATION OF A FAMILY OF REFERENCE PIXELS, CODING AND DECODING USING SUCH A PREDICTION

CROSS-REFERENCE TO RELATED APPLICATIONS

This application is the U.S. national phase of the International Patent Application No. PCT/FR2009/050601 filed Apr. 7, 2009, which claims the benefit of French Application No. 08 52531 filed Apr. 15, 2008, the entire content of which is incorporated herein by reference.

BACKGROUND

The present invention pertains generally to the field of image processing, and more precisely to the coding and to the decoding of digital images and of sequences of digital images.

Digital images and sequences of digital images are known to occupy a great deal of memory space, thus making it necessary, when these images are transmitted, to compress them so as to avoid problems of crowding on the communication network used for this transmission, the bit rate usable on the latter generally being limited.

The H.264/MPEG-4 AVC standard (the initials standing for "Advanced Video Coding"), such as presented in the document ISO/IEC 14496-10, describes in particular a technique according to which groups of pixels, called blocks or macroblocks, of a current, image are predicted spatially with respect to other blocks or macroblocks belonging to the same image. This is what is called Intra coding (or "Intra-frame-coding"). After this predictive coding, the blocks of pixels are transformed, and then quantized. The coefficients of the quantized blocks of pixels are thereafter traversed in an order of reading making it possible to utilize the significant number of zero coefficients in the high frequencies, and are then coded by an entropy coding.

More precisely, during the predictive coding of a macroblock in accordance with the aforementioned standard, with the exception of a macroblock of 16×16 type, the macroblock is generally split according to a plurality of partitions generally having the form of blocks of smaller size and whose contour is rectangular or square. The spatial prediction of such a macroblock in an image consists in predicting each block of smaller size forming this macroblock with respect to one or more blocks of another macroblock of this same image, called a reference macroblock. This prediction is possible only if the reference macroblock neighbors the macroblock to be predicted and is situated in certain predetermined directions with respect to it, that is to say generally above and to the left, in a so-called "causal" neighborhood.

Thus for example, in the case of a macroblock of 16×16 type, the prediction of the pixels which are situated at the bottom, to the right of this macroblock, is necessarily performed with respect to reference pixels which are situated above and to the left of the macroblock. Such reference pixels are very distant spatially from the pixels to be predicted.

The accuracy of such a type of prediction is therefore not optimized, especially in the case of macroblocks having high spatial activity, that is to say in the case where the image to be coded exhibits numerous details.

Furthermore, such a type of prediction lacks flexibility since, to predict the pixels of one and the same partition, it makes it necessary to choose:

reference pixels that are always grouped together in the form of a block or macroblock and often having the same number, these reference pixels not necessarily being adapted for predicting partitions having a different form from that of a rectangle or square, always the same reference pixel or pixels whatever the current partition to be predicted, for a predetermined mode of prediction, always the same reference partition or partitions, whose large spatial distancing with respect to some of the pixels of the partition to be predicted may be detrimental to the accuracy of the prediction, always the same direction or directions of prediction, without taking account of the particular positioning of each pixel of the partition to be predicted.

The present invention is aimed at solving the drawbacks of the prior art by providing a prediction method and device which, for each pixel to be predicted, allows customization of its prediction, with the aim of optimizing the accuracy of the prediction of each pixel.

SUMMARY

To this end, the invention proposes a method for predicting partitions of at least one group of pixels in an image to be coded, with respect to a group of reference pixels, characterized in that the group of reference pixels is obtained by calculating a function characteristic of a predetermined mode of prediction, the reference pixels of the group obtained being able to vary from one partition to another.

Such a prediction of pixel partitions is thus advantageously based on a rule which precisely determines a family or group of reference pixels to be used, and the number of pixels of this family to be used for the prediction of each pixel. Consequently, the prediction of each pixel of a current partition to be predicted is variable, in the sense that the reference pixels used to predict a current pixel may be different from those which served to predict the previous pixel, unless the aforementioned reference pixels all comply with one and the same mode of prediction. It follows from this that such a prediction is performed independently of the number of pixels of a group of reference pixels and of the form according to which the reference pixels are grouped together, thereby making it possible to obtain a much more accurate prediction than the conventional Intra predictions.

According to an advantageous characteristic, when a partition to be predicted contains a contour which prolongs a reference contour, a mode of prediction is defined by the choice, for at least one pixel to be predicted situated in a determined position with respect to the contour of the partition to be predicted, of at least one reference pixel situated in the same position as said pixel to be predicted, with respect to the reference contour.

Such a prediction relies on reference pixels obtained by a function which takes into account the contours contained in reference blocks or macroblocks. Stated otherwise, the aforementioned function determines the closest pixels in a "semantically" identical neighborhood, thereby making it possible to obtain a particularly efficacious prediction.

According to another advantageous characteristic, the mode of prediction is defined by the choice, for at least one pixel of a partition to be predicted, of at least one reference pixel which separates the pixel to be predicted by a predetermined distance.

Such a mode of prediction thus makes it possible to determine in a simple manner and without any other additional criterion, an appropriate number of reference pixels situated for example in the neighborhood closest to the pixel to be predicted, so as to predict this pixel as accurately as possible.

According to yet another advantageous characteristic, a mode of prediction is defined by the choice, for at least one pixel of a partition to be predicted, of at least one reference pixel situated in a predetermined direction, with respect to the pixel to be predicted.

According to yet another advantageous characteristic, the partition of pixels to be predicted has an arbitrary size and form, thereby rendering the method according to the invention particularly adaptable to any type of partitioning of macroblocks to be predicted.

The invention also relates to a method for coding an image or a sequence of images generating a data stream comprising data representative of at least one group of pixels in one of the images, the method comprising, the steps of:

splitting the group of pixels into a plurality of partitions,
predicting partitions,
the method being characterized in that the prediction step is performed in accordance with the aforementioned method.

The invention also relates to a method for decoding a data stream representative of an image or of a sequence of images, the stream comprising data representative of at least one group of pixels in one of the images, the method comprising the steps of:

splitting the group of pixels into a plurality of partitions,
predicting the partitions,
the method being characterized in that the prediction step is performed in accordance with the aforementioned method.

The invention also relates to a carrier signal bearing a data stream representative of an image or of a sequence of images, the stream comprising data representative of at least one group of pixels in one of the images, some of the data being prediction data for partitions of the group of pixels with respect to a group of reference pixels, the signal being characterized in that the prediction data relate to a function characteristic of a predetermined mode of prediction which makes it possible to obtain the group of reference pixels, the reference pixels of the group being able to vary from one partition to another.

The invention further relates to a device for predicting partitions of at least one group of pixels in an image to be coded, with respect to a group of reference pixels, characterized in that it comprises means for calculating a function characteristic of a predetermined mode of prediction to obtain the group of reference pixels, the reference pixels of the group being able to vary from one partition to another.

The invention also relates to a device for coding an image or a sequence of images generating a data stream comprising data representative of at least one group of pixels in one of the images, the device comprising:

means for splitting the group of pixels into a plurality of partitions,
means for predicting the partitions,
the device being characterized in that the prediction means are contained in a prediction device in accordance with the aforementioned device.

The invention also relates to a device for decoding a data stream representative of an image or of a sequence of images, the stream comprising data representative of at least one group of pixels in one of the images, the device comprising:

means for splitting the group of pixels into a plurality of partitions,
means for predicting the partitions,
the device being characterized in that the prediction means are contained in a prediction device in accordance with the aforementioned device.

The invention further relates to a computer program comprising instructions for implementing one of the methods according to the invention, when it is executed on a computer.

BRIEF DESCRIPTION OF THE DRAWINGS

Other characteristics and advantages will become apparent on reading preferred embodiments described with reference to the figures in which:

FIG. 6 represents the partitioned macroblock of FIG. 4B, which has been predicted according to a mode of prediction represented in FIG. 5.

DETAILED DESCRIPTION

An embodiment of the invention will now be described, in which the coding method according to the invention is used to code a sequence of images according to a binary stream much like that obtained by a coding according to the H.264/MPEG-4 AVC standard. In this embodiment, the coding method according to the invention is for example implemented in a software or hardware manner by modifications of a coder initially complying with the H.264/MPEG-4 AVC standard. The coding method according to the invention is represented in the form of an algorithm comprising steps C1 to C6, represented in FIG. 1.

It should be noted that the decoding method according to the invention is symmetrically implemented in a software or hardware manner by modifications of a decoder initially complying with the H.264/MPEG-4 AVC standard.

Figure 2:
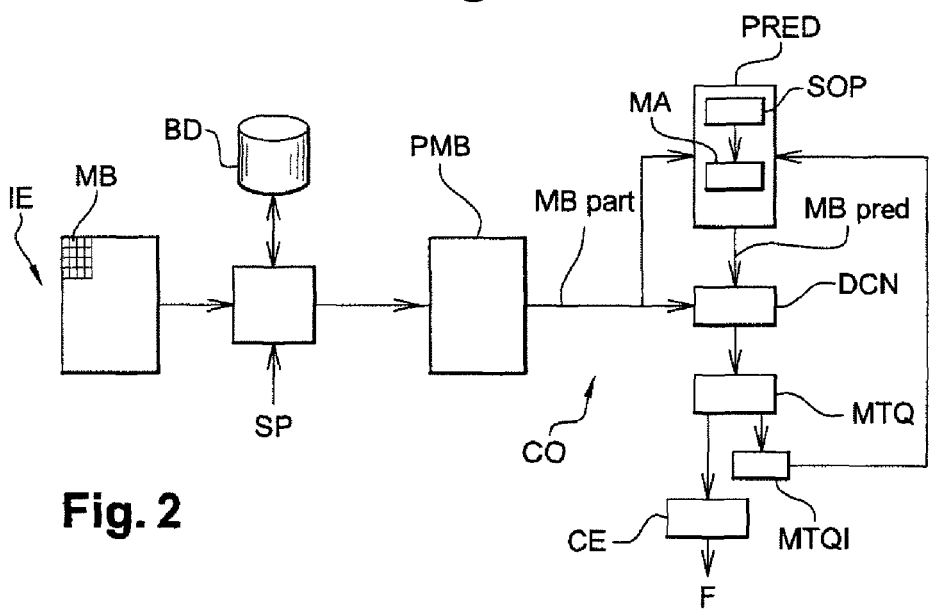
FIG. 2 represents an embodiment of a coding device according to the invention.

According to the embodiment of the invention, the coding method according to the invention is implemented in a coding device CO represented in FIG. 2. The coding performed by the coder CO is of Intra type.

Figure 1:
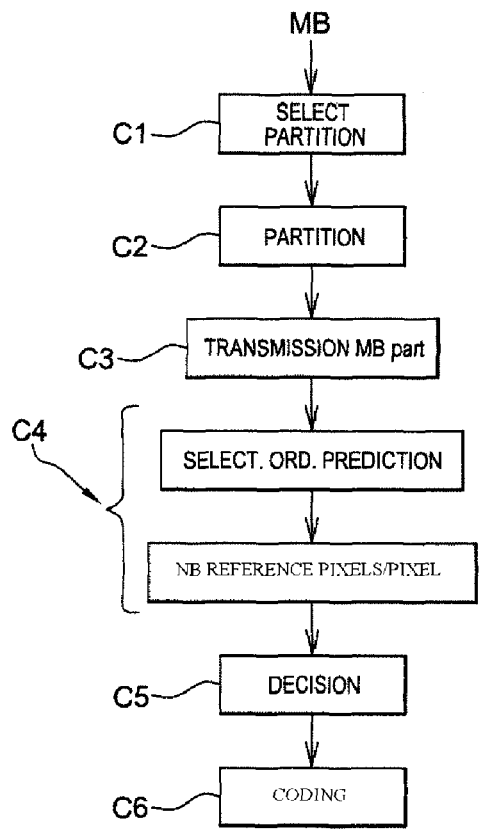
FIG. 1 represents steps of the coding method according to the invention.

The first step C1, represented in FIG. 1, is the selection, for a macroblock belonging to an image IE of the sequence of images to be coded, of a smaller particular partition of pixels chosen from a predetermined set of partitions of predetermined form. For this purpose, a macroblock MB belonging to the image IE, for example of size 8×8, is applied as input to a partitions selection module SP represented in FIG. 2.

This partitions selection module SP uses for example a choice procedure by exhaustive competition or else a procedure for choosing with the aid of an algorithm with a priori. Such procedures are well known to the person skilled in the art (cf.: G. J. Sullivan and T. Wiegand, "Rate-distortion optimization for video compression", *IEEE Signal Proc. Mag.*, pp. 74-90, 1998). They will therefore not be described further on.

Said partitions are grouped together in a database BD of the coder CO. Such partitions may be of rectangular or square form or else of other forms, such as for example substantially linear forms.

Various partitions of a macroblock, for example of size 8×8, able to be selected by the selection module SP, are represented by way of nonlimiting examples in FIG. 3.

Figure 3A:
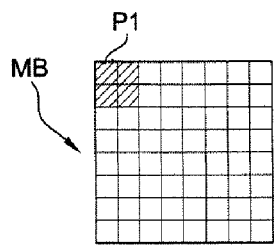
FIG. 3 represents various forms of partitions able to be selected from the coding device according to the invention.

FIG. 3A represents an initial partition P1 having the form of a square.

Figure 3B:
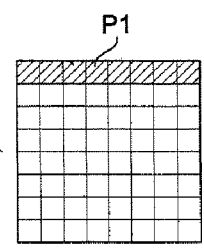

FIG. 3B represents an initial partition P1 having the form of a line.

Figure 3C:
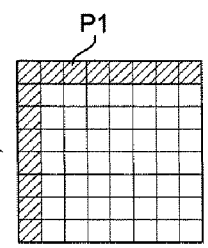

FIG. 3C represents an initial partition P1 having the form of an "L".

Figure 3D:
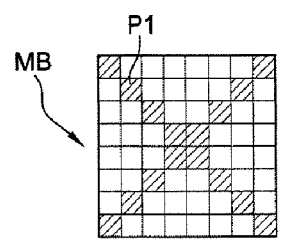

FIG. 3D represents an initial partition P1 having the form of a cross.

Figure 3E:
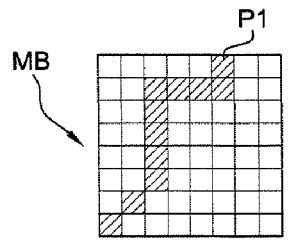

FIG. 3E represents an initial partition P1 having the form of a broken line containing vertical, horizontal and diagonal segments.

Figure 3F:
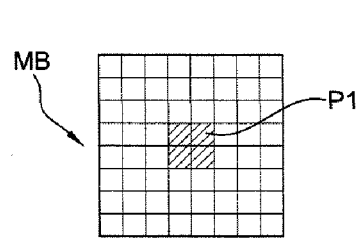

FIG. 3F represents an initial partition P1 having the form of a broken line whose two ends join up so as to form a point. A broken line such as this is for example determined by the gradient of a macroblock situated in the same position in a previous image (colocated).

The following step C2 represented in FIG. 1 is the splitting of the macroblock MB according to a chosen initial partition P1, such as one of those represented in FIG. 3, into n partitions P1, P2, . . . , Pn. Such a splitting is performed by a macroblocks partitioning module PMB represented in FIG. 2 which uses a partitioning algorithm.

FIG. 4 represents the macroblocks MBpart which have been obtained after splitting according to the initial partitions P1 represented in FIG. 3.

As may be noted, the aforementioned partitioning algorithm is designed in such a way that the partitions P1, . . . , Pn thus obtained:

do not overlap in the macroblock MBpart,
and do not necessarily have the same number of pixels and the same form as the initial partition P1.

Figure 4A:
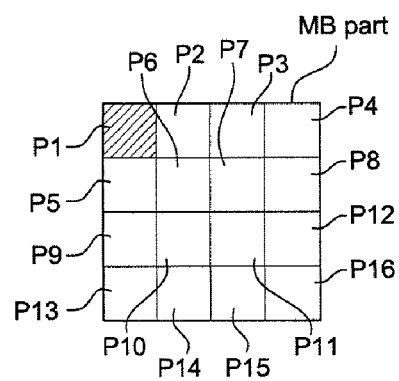
FIG. 4 represents macroblocks partitioned subsequent to the selection of the various initial partitions represented in FIG. 3.

FIG. 4A represents a partitioned macroblock MBpart comprising sixteen partitions P1, . . . , P16, all having the form of a square and the same number of pixels.

Figure 4B:
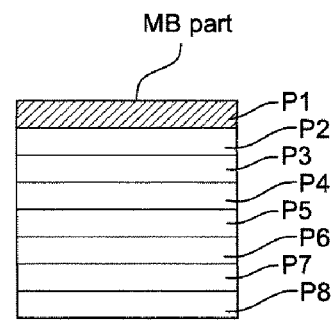

FIG. 4B represents a partitioned macroblock MBpart comprising eight partitions P1 . . . P8, all having the form of a line and the same number of pixels.

Figure 4C:
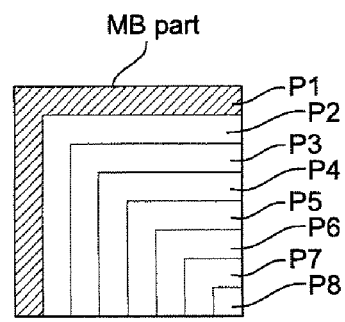

FIG. 4C represents a partitioned macroblock MBpart comprising eight partitions P1 . . . P8, all having the form of an "L", except the last partition P8, but each a different number of pixels.

Figure 4D:
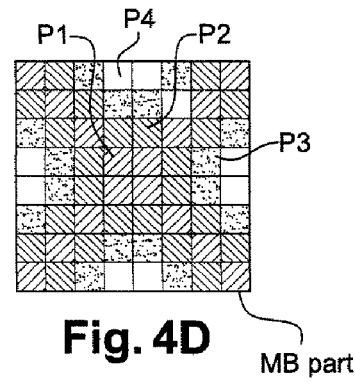

FIG. 4D represents a partitioned macroblock MBpart comprising four partitions P1 . . . P4, almost all having the form of a cross but a different number of pixels.

Figure 4E:
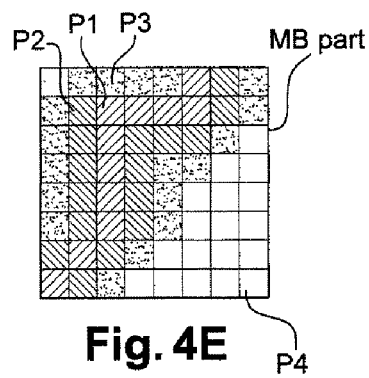

FIG. 4E represents a partitioned macroblock MBpart comprising four partitions P1 . . . P4 almost all having the form of a broken line containing vertical, horizontal and diagonal segments, but each a different number of pixels.

Figure 4F:
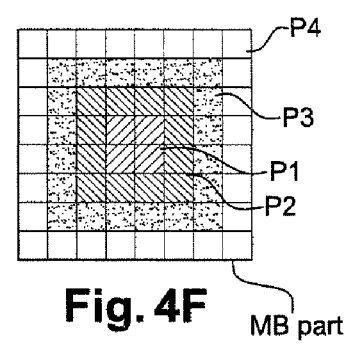

FIG. 4F represents a partitioned macroblock MBpart comprising four partitions P1 . . . P4 all having the form of a broken line whose two ends join up, but each a different number of pixels.

Subsequent to the partitioning step C2, in the course of a step C3 represented in FIG. 1, the partitioning module PMB transmits the macroblock MBpart which has just been partitioned to a prediction calculation module PRED represented in FIG. 2.

In the course of a step C4 represented in FIG. 1, the prediction calculation module PRED calculates various possible predictions of the partitioned macroblock MBpart received. Having regard to the fact that the coder CO is of Intra type, the prediction calculation module PRED calculates the possible spatial predictions of each partition P1, . . . , Pn of the macroblock MBpart, with respect to at least the last previously coded and then decoded partition.

In a particularly advantageous manner, the prediction calculation module PRED predicts the partitions of the macroblock MBpart one after the other, a current partition to be predicted being predicted with reference to at least one partition which immediately precedes it and which has been coded and then decoded, so as to serve thereafter as reference partition.

Thus, the prediction distance is minimized, since the prediction of a partition is made with respect to reference pixels situated in proximity to the pixels of said partition to be predicted.

With reference to FIG. 2, such a reference partition is coded in accordance with the H.264/MPEG-4 AVC standard, that is to say it undergoes, in a manner known per se:

a coding by discrete cosine transform and quantization which is performed by a transform and quantization module MTQ, and then a decoding by inverse discrete cosine transform and inverse quantization, which is performed by the inverse transform and quantization module MTQI.

In the embodiment described, various types of spatial predictions are envisaged which correspond respectively to different orders of traversal of the partitions, in which the prediction calculation module PRED has the possibility of predicting the partitions P1, . . . , Pn of a partitioned macroblock MBpart. Stated otherwise, the prediction calculation module PRED has the possibility of predicting the partitions P1 . . . Pn one after the other, in the order in which they were propagated or else in different orders. For this purpose, with reference to FIG. 2, the prediction calculation module FRED comprises a module SOP for selecting order of traversal of the partitions to be predicted.

Subsequent to the aforementioned selection, and still in the course of the prediction step C4, a software module MA calculates, for each pixel of a current partition Pj to be predicted ($1 \leq j \leq n$), a function which determines a number of useful reference pixels with respect to which each pixel considered is intended to be predicted. Useful reference pixels such as these are pixels which comply with one or more previously fixed modes of prediction.

In the examples of prediction which will be described hereinbelow with reference to FIGS. 6 to 9, the useful reference pixels are those which are situated at a predetermined distance from the current pixel to be predicted, in particular in the neighborhood closest to the latter. The choice of such a mode of prediction thus makes it possible to reduce to the maximum the prediction distance between a current pixel $p_c$ to be predicted and the reference pixel or pixels, with the aim of further refining the accuracy of the prediction and, therefore, of the coding.

In a particularly advantageous manner, the aforementioned mode of prediction constitutes a characteristic of a mathematical function able to determine a predetermined number of reference pixels considered as being situated in the neighborhood closest to the current pixel to be predicted. It is this function which is calculated by the software module MA.

FIG. 5 illustrates two possible mathematical representations of the aforementioned mode of prediction which define, for each pixel to be predicted, the position and the number of the reference pixels to be considered as being situated in the neighborhood closest to the pixel to be predicted.

In the example represented in FIG. 5A, the mathematical function is defined beforehand so as to systematically determine, for each current pixel $p_c$ to be predicted, a number of useful reference pixels, for example the four reference pixels listed hereinbelow:

the reference pixel $p_{r1}$ situated in the closest neighborhood just above the current pixel $p_c$;

the reference pixel $p_{r2}$ situated in the closest neighborhood just below the current pixel $p_c$;

the reference pixel $p_{r3}$ situated in the closest neighborhood to the left of the current pixel $p_c$, along a horizontal direction;

the reference pixel $p_{r4}$ situated in the closest neighborhood to the right of the current pixel $p_c$, along a horizontal direction.

According to another alternative represented in FIG. 5B, the mathematical function is defined beforehand so as to determine, for each current pixel $p_c$ to be predicted, four additional reference pixels listed hereinbelow:

the reference pixel $p_{r5}$ situated in the neighborhood closest to the current pixel $p_c$, in the left upper diagonal direction;

the reference pixel $p_{r6}$ situated in the neighborhood closest to the current pixel $p_c$, in the right upper diagonal direction;

the reference pixel $p_{r7}$ situated in the neighborhood closest to the current pixel $p_c$, in the left lower diagonal direction;

the reference pixel $p_{r8}$ situated in the neighborhood closest to the current pixel $p_c$, in the left lower diagonal direction.

An exemplary prediction, which is based on the closest neighborhood criterion which has just been mentioned, will now be described with reference to FIG. 6.

Figure 5A:
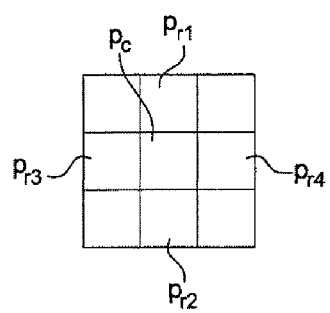
FIG. 5 represents two modes of prediction able to characterize the prediction function according to the invention.
Figure 5B:
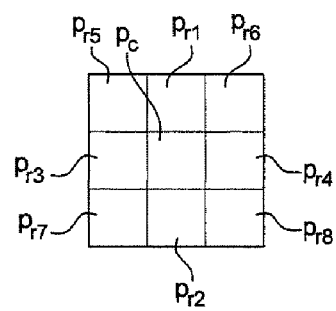

It is assumed, in this example, that:

each partitioned macroblock MBpart to be predicted is that of FIG. 4B, that is to say split into eight partitions P1, . . . , P8 having the form of lines, the module SOP for selecting order of traversal of partitions has selected an order of traversal which differs from the order in which the partitions P1 to P8 were propagated, the mathematical function, which is intended to be calculated by the software module MA, is defined as in FIG. 5B, with a number of reference pixels fixed systematically at two, for each current pixel $p_c$ to be predicted.

More precisely, the prediction calculation module PRED of FIG. 2 traverses from left to right a first line of the macroblock MBpart represented in FIG. 4B, and which is intended to be assigned to the prediction of the initial partition P1. The chosen first line corresponds to the last line of the macroblock MBpart. The software module MA then calculates, for each pixel of said partition P1 to be predicted, a function which determines the two reference pixels which are situated in the neighborhood closest to the current pixel to be predicted.

Specifically, for each pixel of the partition P1 to be predicted, the mathematical function determines on the basis of the eight reference pixels modeled as in FIG. 5B and which are liable to be selected, the two reference pixels for which the distance which separates each of them from the current pixel to be predicted has been estimated as being the smallest in comparison with the distances which have been estimated for the other six reference pixels.

FIG. 6A represents the two reference pixels determined by the aforementioned mathematical function, in the case solely of the prediction of the first, fifth and eighth pixels of the partition P1, this for the sake of the clarity of the drawing.

It is thus noted that:

the first pixel $p_{c1}$ of the partition P1 is predicted with respect to two reference pixels belonging to the vertical reference partition PRV of a neighbor macroblock (not represented), which partition having been coded, and then decoded, as explained previously: these two reference pixels have been determined as being respectively the reference pixel situated in the neighborhood closest to the current pixel $p_{c1}$, in the left upper diagonal direction, and the reference pixel situated in the closest neighborhood to the left of the current pixel $p_{c1}$, along a horizontal direction;

the fifth pixel $p_{c5}$ of the partition P1 is predicted with respect to two reference pixels also belonging to the aforementioned vertical reference partition PRV: these two reference pixels have been determined as being respectively the reference pixel situated in the neighborhood closest to the current pixel $p_{c1}$, in the left upper diagonal direction, and the reference pixel situated in the closest neighborhood to the left of the current pixel $p_{c1}$, along a horizontal direction;

the eighth pixel $p_{c8}$ of the partition P1 is predicted with respect to two reference pixels, one of which belongs to the aforementioned vertical reference partition PRV and the other of which belongs to the horizontal reference partition PRH of a neighbor macroblock (not represented), which partition having been coded, and then decoded, as explained previously: these two reference pixels have been determined as being respectively the reference pixel situated in the closest neighborhood to the left of the current pixel $p_{c8}$, along a horizontal direction, and the reference pixel situated in the closest neighborhood just above the current pixel $p_{c8}$.

Once all the pixels of the partition P1 have been predicted as described hereinabove, the prediction calculation module PRED delivers a first predicted partition which, in the case where the latter is retained by the coder CO as being the optimal partition type, is immediately coded by the transform and quantization module MTQ, and then decoded by the inverse transform and quantization module MTQI. On completion of these operations, a reference partition PR1 is obtained, as represented in FIG. 6B.

The prediction calculation module PRED thereafter traverses from left to right a second line of the macroblock MBpart, and which is intended to be assigned to the prediction of the second partition P2. The chosen second line is the fourth line of the macroblock MBpart. The software module MA then calculates, for each pixel of said partition P2 to be predicted, the aforementioned function which determines the two reference pixels situated in the neighborhood closest to the current pixel to be predicted.

FIG. 6B represents the two reference pixels chosen in the case solely of the prediction of the first, fourth and seventh pixels of the partition P2, this for the sake of the clarity of the drawing.

It is thus noted that:

the first pixel $p_{c1}$ of the partition P2 is predicted with respect to two reference pixels belonging to the aforementioned vertical reference partition PRV: these two reference pixels have been determined as being respectively the reference pixel situated in the neighborhood closest to the current pixel $p_{c1}$, in the left upper diagonal direction, and the reference pixel situated in the closest neighborhood to the left of the current pixel $p_{c1}$, along a horizontal direction;

the fourth pixel $p_{c4}$ of the partition P2 is predicted with respect to two reference pixels, belonging respectively to the aforementioned vertical reference partition PRV and to the aforementioned horizontal reference partition PRH: these two reference pixels have been determined as being respectively the reference pixel situated in the closest neighborhood to the left of the current pixel $p_{c4}$, along a horizontal direction, and the reference pixel situated in the closest neighborhood just above the current pixel pc4;

the seventh pixel $p_{c7}$ of the partition P2 is predicted with respect to two reference pixels, one of which belongs to the aforementioned vertical reference partition PRH and the other of which belongs to the aforementioned reference partition PR1: these two reference pixels have been determined as being respectively the reference pixel situated in the closest neighborhood just above the current pixel $p_{c7}$ and the reference pixel situated in the closest neighborhood just below the current pixel $p_{c7}$.

Once all the pixels of the partition P2 have been predicted as described hereinabove, the prediction calculation module PRED delivers a second predicted partition which is immediately coded by the transform and quantization module MTQ, and then decoded by the inverse transform and quantization module MTQI. On completion of these operations, a reference partition PR2 is obtained, as represented in FIG. 6C.

The prediction calculation module PRED thereafter traverses from left to right a third line of the macroblock MBpart, and which is intended to be assigned to the prediction of the third partition P3. The chosen third line is the second line of the macroblock MBpart. The software module MA then calculates, for each pixel of said partition P3 to be predicted, the aforementioned function which determines the two reference pixels situated in the neighborhood closest to the current pixel to be predicted.

FIG. 6C represents the two reference pixels chosen in the case solely of the prediction of the first, second and fourth pixels of the partition P3, this for the sake of the clarity of the drawing.

It is thus noted that:

the first pixel $p_{c1}$ of the partition P3 is predicted with respect to two reference pixels belonging to the aforementioned vertical reference partition PRV: these two reference pixels have been determined as being respectively the reference pixel situated in the neighborhood closest to the current pixel $p_{c1}$, in the left upper diagonal direction, and the reference pixel situated in the closest neighborhood to the left of the current pixel $p_{c1}$ along a horizontal direction;

the second pixel $p_{c2}$ of the partition P3 is predicted with respect to two reference pixels belonging respectively to the aforementioned vertical reference partition PRV and to the aforementioned horizontal reference partition PRH: these two reference pixels have been determined as being respectively the reference pixel situated in the closest neighborhood to the left of the current pixel $p_{c2}$, along a horizontal direction, and the reference pixel situated in the closest neighborhood just above the current pixel $p_{c2}$;

the fourth pixel $p_{c4}$ of the partition P3 is predicted with respect to two reference pixels, one of which belongs to the aforementioned vertical reference partition PRH and the other of which belongs to the aforementioned reference partition PR2: these two reference pixels have been determined as being respectively the reference pixel situated in the closest neighborhood just above the current pixel $p_{c4}$ and the reference pixel situated in the closest neighborhood just below the current pixel $p_{c4}$.

The prediction calculation module PRED delivers a third predicted partition which is immediately coded by the transform and quantization module MTQ, and then decoded by the inverse transform and quantization module MTQI. On completion of these operations, a reference partition PR3 is obtained (not represented).

The other partitions P4 to P8 are predicted in the same manner as described hereinabove so as to obtain a predicted macroblock MBpred whose predicted partitions PR5, PR3, . . . , PR2, . . . , PR8, PR1 follow one another according to a dichotomic order which is different from the order of propagation of the partitions P1 to P8. Such a predicted macroblock is represented in FIG. 6D.

An exemplary prediction, which is based on the closest neighborhood criterion which has just been defined, to which is added a neighborhood directional criterion, will now be described with reference to FIG. 7.

It is assumed, in this example, that:

each partitioned macroblock MBpart to be predicted is that of FIG. 4C, that is to say split into eight partitions P1, . . . , P8 having the form of an "L", the module SOP for selecting order of traversal of partitions has selected an order of traversal which corresponds to the order in which the partitions P1 to P8 were propagated, the mathematical function, which is intended to be calculated by the software module MA, is defined as in FIG. 5A, with, for each pixel to be predicted:

a number of reference pixels fixed this time systematically at one, the reference pixel that has to be situated first above the current pixel to be predicted, in the vertical direction.

More precisely, the prediction calculation module PRED of FIG. 2 traverses the first partition P1 of the macroblock MBpart represented in FIG. 4C, and which is intended to be predicted. The software module MA then calculates, for each pixel of said partition P1 to be predicted, a function which determines the reference pixel which is situated first above the pixel to be predicted, in the vertical direction.

Such a function is calculated in the following manner.

Let p(x,y) be the pixel to be predicted, p(x,y) belonging to the current partition pj, and |x| being the value measuring the distance x which separates the pixel to be predicted from a reference pixel. The reference pixel to be used is equal to p(x, y'), with y'=argmin |y'−y| with p(x,y') belonging to pi, i<j.

Figure 7A:
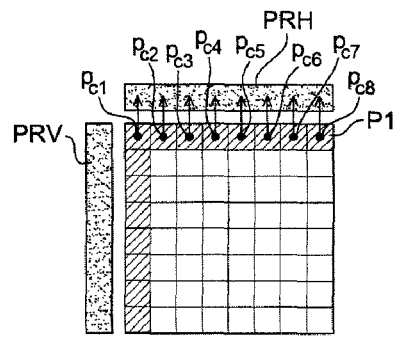
FIG. 7 represents the partitioned macroblock of FIG. 4C, which has been predicted according to a mode of prediction represented in FIG. 5.

FIG. 7A represents the reference pixel determined by the aforementioned mathematical function, in the case solely of the prediction of the first eight pixels $p_{c1}$ to $p_{c8}$ of the partition P1, this for the sake of the clarity of the drawing.

It is thus noted that the pixels $p_{c1}$ to $p_{c8}$ are predicted respectively with respect to eight reference pixels of the horizontal partition PRH which are immediately above them, in the vertical direction.

Once all the pixels of the partition P1 have been predicted as described hereinabove, the prediction calculation module PRED delivers a first predicted partition which is immediately coded by the transform and quantization module MTQ, and then decoded by the inverse transform and quantization module MTQI. On completion of these operations, a reference partition PR1 is obtained, as represented in FIG. 7B.

The prediction calculation module PRED thereafter traverses the second partition of the macroblock MBpart intended to be predicted. The software module MA then calculates, for each pixel of said partition P2 to be predicted, a function which determines the reference pixel which is situated first above the pixel to be predicted, in the vertical direction.

Figure 7B:
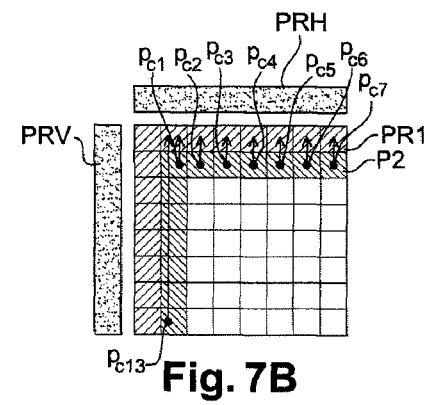

FIG. 7B represents the reference pixel determined by the aforementioned mathematical function, in the case solely of the prediction of the first seven pixels $p_{c1}$ to $p_{c7}$ and of the thirteenth pixel $p_{c13}$ of the partition P2, this for the sake of the clarity of the drawing.

It is thus noted that the pixels $p_{c1}$ to $p_{c7}$ and $p_{c13}$ are predicted respectively with respect to eight reference pixels of the reference partition PR1 which are immediately above them in the vertical direction. In particular, the pixels $p_{c1}$ and $p_{c13}$ are predicted using the same reference pixel.

The prediction calculation module PRED delivers a second predicted partition which is immediately coded by the transform and quantization module MTQ, and then decoded by the inverse transform and quantization module MTQI. On completion of these operations, a reference partition PR2 is obtained (not represented).

Figure 7C:
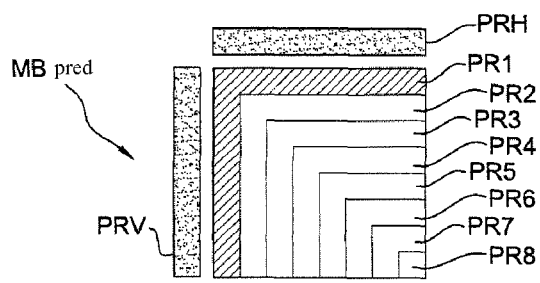

The other partitions P3 to P8 are predicted in the same manner as described hereinabove so as to obtain a predicted macroblock MBpred whose predicted partitions PR1 to PR8 follow one another in the order in which the partitions P1 to P8 were propagated. Such a predicted macroblock is represented in FIG. 7C.

In a variant of the mode of prediction of FIG. 7, the aforementioned mathematical function is parametrized to determine, for each pixel to be predicted, two reference pixels which are situated with respect to the current pixel to be predicted, respectively along two predetermined directions, instead of just one.

The two reference pixels to be considered are for example:
that which is situated first, to the left of the current pixel to be predicted, in the horizontal direction,
and that which is situated first above the current pixel to be predicted, in the vertical direction.

Figure 8:
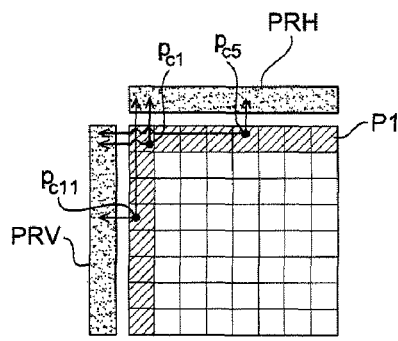
FIG. 8 represents a first variant of the prediction of FIG. 7.

Such a variant is represented in FIG. 8, for which only the prediction of the first partition P1 is represented.

FIG. 8 represents the reference pixels determined by the aforementioned mathematical function, in the case solely of the prediction of the first, fifth and eleventh pixels $p_{c1}$, $p_{c5}$ and $p_{c11}$ of the partition P1, this for the sake of the clarity of the drawing.

In another variant of the mode of prediction of FIG. 7, the aforementioned mathematical function is parametrized to determine, for each pixel to be predicted, two reference pixels which are situated with respect to the current pixel to be predicted, along one and the same predetermined direction.

The two reference pixels to be considered are for example:
that which is situated first above the current pixel to be predicted, in the vertical direction,
and that which is situated second above the current pixel to be predicted, in the vertical direction.

Figure 9:
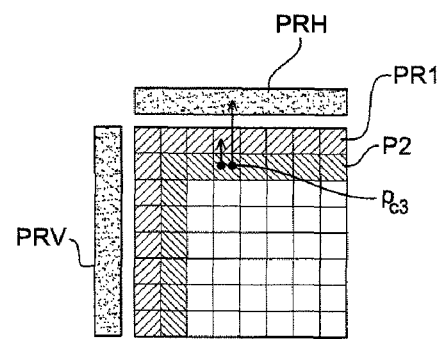
FIG. 9 represents a second variant of the prediction of FIG. 7.

Such a variant is represented in FIG. 9, for which only the prediction of the second partition P2 is represented.

FIG. 9 represents the reference pixels determined by the aforementioned mathematical function, in the case solely of the prediction of the third pixel $p_{c3}$ of the partition P2, this for the sake of the clarity of the drawing.

Figure 10:
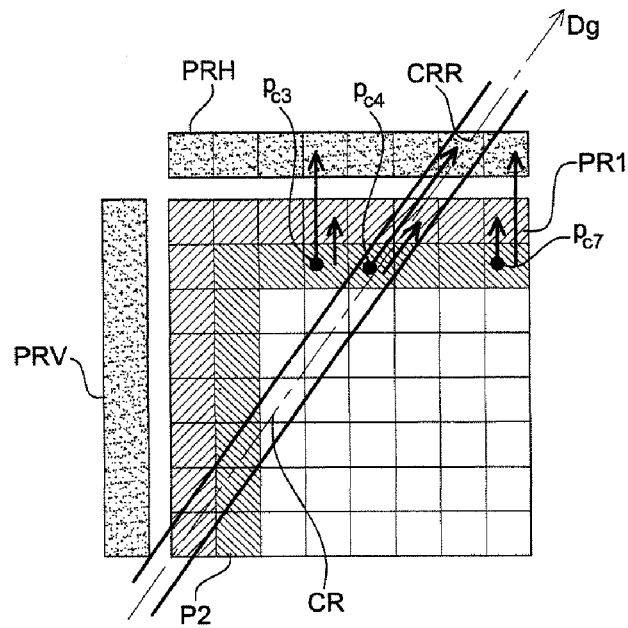
FIG. 10 represents an additional mode of prediction able to characterize the prediction function according to the invention.

A mode of prediction adapted to the case where the partitions to be predicted contain a contour CR which prolongs a reference contour CRR will now be described with reference to FIG. 10. With reference to FIG. 10, the contour CRR and its prolongation CR extend for example along a diagonal direction Dg.

Such a contour is detected in a manner known per se by a contour detection algorithm.

It is assumed, in this example, that:
each partitioned macroblock MBpart to be predicted is that of FIG. 4C, that is to say split into eight partitions P1, . . . , P8 having the form of an "L",
the module SOP for selecting order of traversal of partitions has selected an order of traversal which corresponds to the order in which the partitions P1 to P8 were propagated,
the mathematical function, which is intended to be calculated by the software module MA, is parametrized so as to determine, for each pixel to be predicted:
a number of reference pixels fixed for example at two,
the reference pixels that have to be situated, with respect to the reference contour CRR, in the same position as that of the pixel to be predicted with respect to the contour CR of the partition to be predicted.

FIG. 10 represents the reference pixels determined by the aforementioned mathematical function, in the case solely of the prediction, in respect of the partition P2:
of the third pixel $p_{c3}$ which is situated to the left of the contour CR,
of the fourth pixel $p_{c4}$ which is situated on the contour CR,
and of the seventh pixel $p_{c7}$ which is situated to the right of the contour CR,
this again for the sake of the clarity of the drawing.

With reference to this figure, the two reference pixels to be used to predict the pixel $p_{c3}$ are indeed two pixels disposed also to the left of the reference contour CRR. According to a variant, these two pixels may be:
that which is situated first above the current pixel to be predicted, in the vertical direction (fourth horizontal pixel of PR1),
and that which is situated second above the current pixel to be predicted, in the vertical direction (fourth horizontal pixel of PRH).

Still with reference to FIG. 10, the two reference pixels to be used to predict the pixel $p_{c4}$ are indeed two pixels also disposed on the reference contour CRR. According to a variant, these two pixels may be:
that which is situated first above the current pixel to be predicted, in the diagonal direction Dg (sixth horizontal pixel of PR1),
and that which is situated second above the current pixel to be predicted, in the diagonal direction Dg (seventh horizontal pixel of PRH).

Still with reference to FIG. 10, the two reference pixels to be used to predict the pixel $p_{c7}$ are indeed two pixels disposed also to the right of the reference contour CRR. According to a variant, these two pixels may be:
that which is situated first above the current pixel to be predicted, in the vertical direction (seventh horizontal pixel of PR1),
and that which is situated second above the current pixel to be predicted, in the vertical direction (seventh horizontal pixel of PRH).

Thus, in accordance with the examples of modes of prediction which have just been described with reference to FIGS. 6 to 10, it is understood that the function which is calculated by the software module MA constitutes, stated otherwise, a rule which makes it possible to determine, for a given type of partitioning of a macroblock to be predicted (square block, lines, "L", etc.), a particular family of reference pixels.

In a particularly advantageous manner, such a rule is adjustable according to the type of partitioning selected, according to the degree of accuracy of the prediction that is desired or else according to the number of available reference pixels, according to the presence of contours, etc., by virtue in particular of the multiple characteristics which define it (disposition of the reference pixel or pixels with respect to the pixel to be predicted, disposition of the reference pixel or pixels in a given direction, disposition of the reference pixel or pixels with respect to a contour which is prolonged in the partition to be predicted, etc.).

Once various possible predictions have been calculated by the prediction calculation module PRED, in the course of a step C5 represented in FIG. 1, a decision module DCN, represented in FIG. 2, traverses the partitioned macroblocks of the image IE and chooses, in this step C5, the mode of prediction used to code each of these macroblocks. From among the possible predictions for a macroblock, the decision module DCN chooses the optimal prediction according to a distortion bit rate criterion well known to the person skilled in the art.

For a current macroblock MB to be coded, the decision module DCN places for example in competition the prediction modes represented in FIGS. 7 and 8.

Each predicted macroblock MBpred is coded, in the course of a step C6, as in the H.264/MPEG-4 AVC standard. More precisely with reference to FIG. 11, where a slice T of coded macroblock of the image IE is represented, each coded macroblock comprises a field CH1 specifying the type of coding of the macroblock MB considered, Intra in the case of the embodiment represented, a field CH2 indicating the form of the selected partition (square, line, column, cross, "L", etc.), a field CH3 indicating the prediction function used, and a field CH4 coding the values of the residuals of the predicted macroblock MBpred.

Once this structural coding has been performed by the decision module DCN, the coefficients of residuals if they exist, corresponding to the blocks of the image IE, are dispatched to the transform and quantization module MTQ, to undergo discrete cosine transforms followed by a quantization. The slices of macroblocks with these quantized coefficients are thereafter transmitted to the entropy coding module CE, so as to produce, with the other images of the video sequence already coded in the same manner as the image IE, a binary video stream F coded according to the invention.

The binary stream F thus coded is transmitted by a communication network to a remote terminal. The latter comprises a decoder DEC according to the invention, represented in FIG. 12.

The binary stream F is firstly dispatched to an entropy decoding module DE, decoding inverse to that performed by the entropy coding module CE represented in FIG. 2. Next, for each image macroblock to be reconstructed, the coefficients decoded by the module DE are dispatched to an inverse quantization and inverse transform module MTQI.

Figure 13:
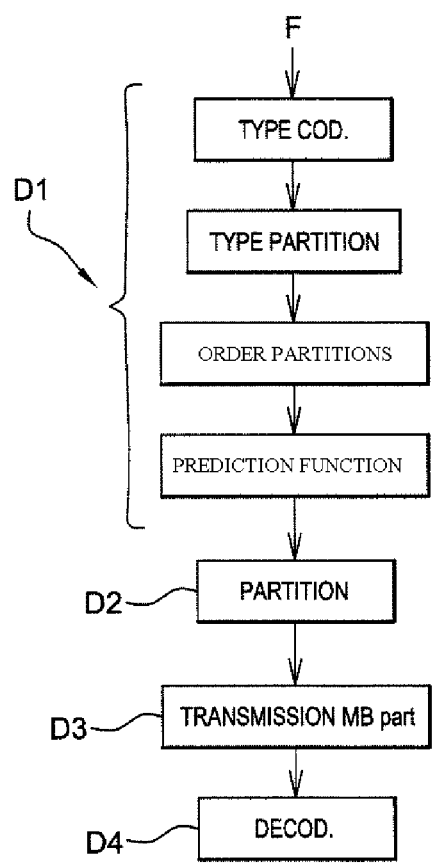
FIG. 13 represents steps of the decoding method according to the invention.

An image reconstruction module RI then receives decoded data corresponding to the data produced by the module DCN (FIG. 2) in step C5 of coding according to the invention, to within transmission errors. The module RI implements steps D1 to D4 of the decoding method according to the invention, such as are represented in FIG. 13.

The first step D1 is the decoding of data structures coded in a slice T of a current macroblock of the image IE to be decoded. In a manner known per se, the reconstruction module RI determines in the field CH1 (FIG. 11) that the data of the slice T have undergone a coding of Intra type.

In the course of this same step, the reconstruction module RI determines, in accordance with the decoding method according to the invention:

the form of the initial partition P1 to be reconstructed, by virtue of the field CH2 (FIG. 7), the prediction function selected by the decision module DCN (FIG. 2), by virtue of the field CH3.

If for example, the initial partition P1 has the form of an "L" as represented in FIG. 4C, and the optimal prediction function is that which makes it possible to perform the prediction represented in FIG. 7, the reconstruction module RI deduces therefrom the order in which the various partitions P1 to P8 of the current macroblock will be decoded and the prediction function associated with each partition. Such a deduction is for example performed by means of a correspondence table (not represented) which is stored in the decoder DEC.

The following step D2 represented in FIG. 13 is the splitting of the current macroblock to be decoded, on the basis of the initial partition P1 determined in step D1, into a plurality of n partitions P1, P2, . . . , Pn. This partitioning is performed by a macroblocks partitioning module PMB which in all respects resembles that represented in FIG. 2.

Figure 12:
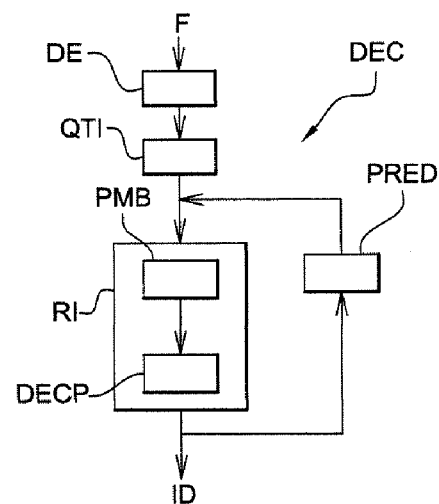
FIG. 12 represents a decoding device according to the invention.

Subsequent to the partitioning step D2, in the course of a step D3 represented in FIG. 13, the partitioning module PMB transmits the current macroblock to be decoded and which has just been partitioned into n partitions, to a partitions decoding module DECP represented in FIG. 12.

In the course of a step D4 represented in FIG. 13, the module DECP then performs a decoding of the n partitions according to the order of decoding and the prediction function which were determined in step D1.

For this purpose, for each partition to be decoded of a current macroblock to be decoded, the decoding module DECP uses prediction values for the immediately preceding partition or partitions which are provided by the prediction calculation module PRED, represented in FIG. 13.

The prediction calculation module PRED in fact receives the values of the partitions previously decoded by the reconstruction module RI, which values it keeps in memory.

Figure 11:
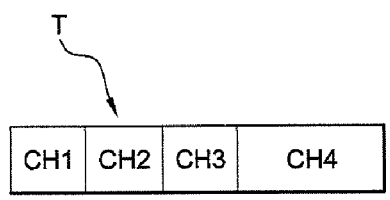
FIG. 11 represents the structure of a macroblock coded by the coding device according to the invention.

The n partitions of a macroblock of the image IE are decoded using the Intra spatial prediction indicated in the field CH1 represented in FIG. 11.

Once all the macroblocks of the image IE have been decoded, the image reconstruction module RI provides as output from the decoder DEC, an image ID corresponding to the decoding of the image IE.

The invention claimed is:

1. A method for predicting pixels in an image to be coded with an image coder comprising the steps of:
    selecting sets of reference pixels;
    determining distances from a current pixel of a group of current pixels to each pixel of the sets of reference pixels, respectively;
    selecting a group of reference pixels for the current pixel using a predetermined prediction mode, wherein the group of reference pixels is located in the sets and is closest to the current pixel;
    predicting the current pixel based on the reference pixel which, out of the group of reference pixels, is closest to the current pixel.

2. The method of claim 1, further comprising:
    determining the number of reference pixels to be selected for the group of reference pixels, wherein the number corresponds to the predetermined prediction mode.

3. The method of claim 1, further comprising:
detecting that a predicted partition contains a contour that prolongs a reference contour,
wherein the selecting step comprises selecting at least one reference pixel of the group of reference pixels that is situated in a same position with respect to the reference contour as at least one current pixel of the group of current pixels.

4. The method according to claim 1, further comprising:
choosing a distance between at least one of the group of current pixels and at least one of the group of reference pixels,
wherein the predetermined prediction mode is based on the chosen distance.

5. The method according to claim 4, wherein the choosing step comprises minimizing the distance so that the reference pixels of the group of reference pixels are situated in a neighborhood closest to the at least one of the group of current pixels.

6. The method according to claim 1, further comprising choosing a direction from at least one current pixel of the group of current pixels to at least one of the group of reference pixels,
wherein the predetermined prediction mode is based on the chosen direction.

7. The method according to claim 1, wherein the reference pixels of the group of reference pixels are variable from one partition to another, the method further comprising:
predicting, according to the predetermined prediction mode, the partitions of a group of current pixels based on at least one of the group of reference pixels;
splitting the group of current pixels into a plurality of partitions according to the predicted partitions; and
coding the image using the plurality of partitions.

8. The method according to claim 7, further comprising
receiving a data stream that includes data representations of the image; and
decoding the image based on the plurality of partitions.

9. A non-transitory computer readable medium comprising instructions for implementing the steps recited in claim 1.

10. A method for predicting pixels in an image to be decoded with an image decoder comprising the steps of:
selecting sets of reference pixels;
determining distances from a current pixel of a group of current pixels to each pixel of the sets of reference pixels, respectively;
selecting a group of reference pixels for the current pixel using a predetermined prediction mode, wherein the group of reference pixels is located in the sets and is closest to the current pixel;
predicting the current pixel based on the reference pixel which, out of the group of reference pixels, is closest to the current pixel.

11. A non-transitory computer readable medium comprising instructions for implementing the steps recited in claim 10.

12. The method of claim 10, further comprising:
determining the number of reference pixels to be selected for the group of reference pixels,
wherein the number corresponds to the predetermined prediction mode.

13. The method of claim 10, further comprising:
detecting that a predicted partition contains a contour that prolongs a reference contour,
wherein the selecting step comprises selecting at least one reference pixel of the group of reference pixels that is situated in a same position with respect to the reference contour as at least one current pixel of the group of current pixels.

14. The method according to claim 10, further comprising:
choosing a distance between at least one of the group of current pixels and at least one of the group of reference pixels,
wherein the predetermined prediction mode is based on the chosen distance.

15. The method according to claim 14, wherein the choosing step comprises minimizing the distance so that the reference pixels of the group of reference pixels are situated in a neighborhood closest to the at least one of the group of current pixels.

16. The method according to claim 10, further comprising
choosing a direction from at least one current pixel of the group of current pixels to at least one of the group of reference pixels,
wherein the predetermined prediction mode is based on the chosen direction.

17. The method according to claim 10, wherein the reference pixels of the group of reference pixels are variable from one partition to another, the method further comprising:
predicting, according to the predetermined prediction mode, the partitions of a group of current pixels based on at least one of the group of reference pixels;
splitting the group of current pixels into a plurality of partitions according to the predicted partitions; and
decoding the image using the plurality of partitions.

18. The method of claim 10, wherein the plurality of reference pixels of the group consists of:
a first pixel located in the neighborhood immediately above the current pixel;
a second pixel located in the neighborhood immediately above the current pixel;
a third pixel located in the neighborhood immediately to the left of the current pixel; and
a fourth pixel located in the neighborhood immediately to the right of the current pixel.

19. A method for predicting pixels in an image to be decoded with an image decoder comprising the steps of:
selecting sets of reference pixels;
determining distances from a current pixel of a group of current pixels to each pixel of the sets of reference pixels, respectively;
selecting a group of reference pixels for the current pixel using a predetermined prediction mode, wherein the group of reference pixels is located in the sets and is closest to the current pixel;
predicting the current pixel based on at least one pixel of the group of reference pixels, the at least one pixel being located in a predetermined direction of prediction.

20. The method of claim 19, wherein the predetermined direction of prediction is a horizontal direction.

21. The method of claim 19, wherein the predetermined direction of prediction is a vertical direction.

22. The method of claim 19, wherein the predicting step comprises predicting the current pixel based on a plurality of the group of reference pixels including said at least one pixels, wherein the plurality of pixels are located in the same predetermined direction of prediction.

23. A method for predicting pixels in an image to be decoded-with an image decoder comprising the steps of:
selecting sets of reference pixels;

determining distances from a current pixel of a group of current pixels to each pixel of the sets of reference pixels, respectively;

selecting a group of reference pixels for the current pixel using a predetermined prediction mode, the group of references pixels including a first reference pixel and a second reference pixel, wherein the group of reference pixels is located in the sets and is closest to the current pixel, wherein the first reference pixel is located in a first predetermined direction of prediction and the second reference pixel is located in a second predetermined direction of prediction, the first and second predetermined directions being different from one another;

predicting the current pixel based on the first and second reference pixels.

24. The method of claim 23, wherein the first predetermined direction of prediction is a vertical direction and the second predetermined direction of prediction is a horizontal direction.

* * * * *